(No Model.)
C. L. PORTER.
PROCESS OF RECOVERING GLYCERINE FROM SPENT SOAP LYES.
No. 420,830. Patented Feb. 4, 1890.
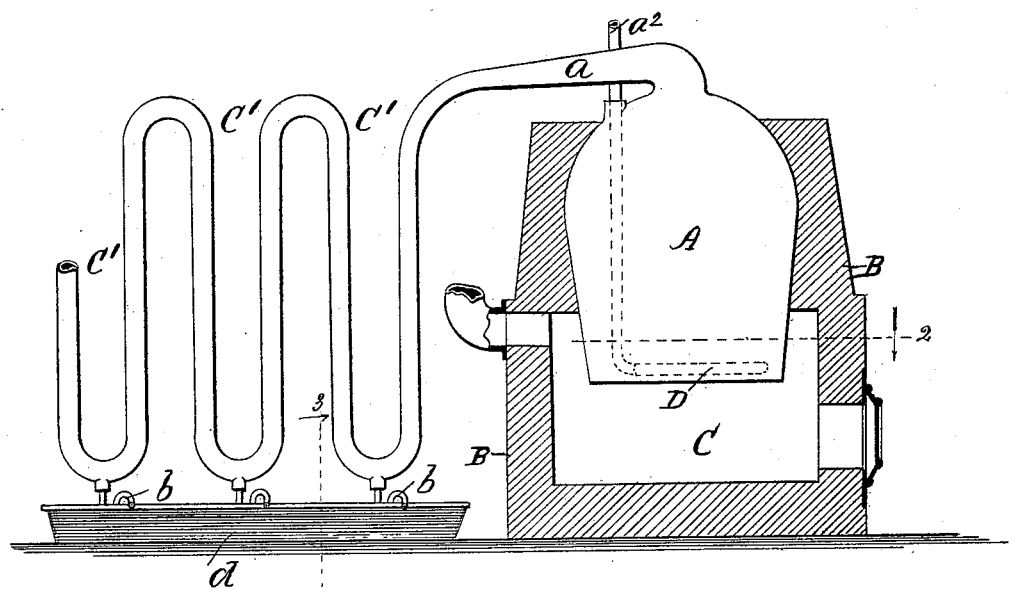
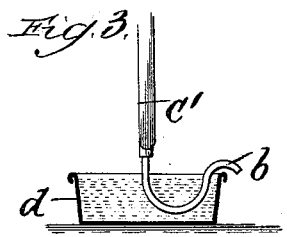
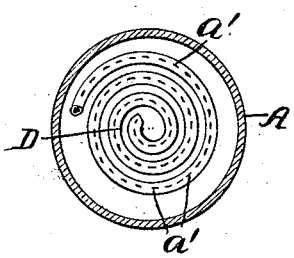
Witnesses.
Inventor;
C. L. Porter.
By L. B. Copland & Co.
Attys.

UNITED STATES PATENT OFFICE.

CHARLES LEWIS PORTER, OF CHICAGO, ILLINOIS.

PROCESS OF RECOVERING GLYCERINE FROM SPENT SOAP-LYES.

SPECIFICATION forming part of Letters Patent No. 420,830, dated February 4, 1890.

Application filed August 24, 1888. Serial No. 283,648. (No model.)

*To all whom it may concern:*

Be it known that I, CHARLES LEWIS PORTER, a citizen of the United States, residing at Chicago, in the county of Cook and State of Illinois, have invented certain new and useful Improvements in a Process for the Extraction of Glycerine from Spent Lyes, of which the following is a full, clear, and exact description, that will enable others to make and use the same, reference being had to the accompanying drawings, forming a part of this specification.

The object of this invention or discovery is an improvement in the art of extracting glycerine from spent lyes or the refuse liquid obtained from the manufacture of soap.

Figure 1 is a side elevation of a distilling apparatus used in carrying out my process, the furnace-walls inclosing the retort being shown in section; Fig. 2, a horizontal section in plane 2, Fig. 1, looking in the direction indicated by the arrow, the inclosing masonry being omitted; and Fig. 3, a broken-away vertical section in plane 3, Fig. 1, looking in the direction indicated by the arrow.

The first operation is to separate as much of the salt from the soap-liquid as possible by crystallization, and at the same time take up and remove the free alkali by the addition of rosin, red oil, or fats which form a soap, the soap rising to the top of the liquid and then being removed by skimming. The soap-liquid containing the glycerine is next run into a suitable vessel or receptacle, and is treated with sulphuric acid until neutralized or made acid in accordance with the condition of the glycerine-liquid under treatment— that is, the spent lyes are made acid when they do not require an appreciable amount of sulphuric acid to neutralize them. The object of this is to have a sulphate of soda present in the glycerine stock, for the reason that sulphate of soda is more soluble than chloride of sodium, so that when the glycerine is made anhydrous in a subsequent step of the process the greater part of the chloride of sodium is crystallized from the glycerine that would be retained but for the presence of the sulphate of soda. It is seldom required in practice to use an excess of acid, as the lyes when concentrated always contain a quantity of free lye that is converted into sulphate of soda by the addition of sulphuric acid. When sulphuric acid is added in small quantities at a time to glycerine-liquid containing chloride of sodium as made from spent lyes, the chloride of sodium is decomposed with the liberation of hydrochloric-acid vapors, and unless the acid added is greatly in excess of the quantity required the glycerine is not decomposed. Superheated steam or steam under a high pressure is next passed through the liquid by means of perforated coil to aid in the decomposition of the salt and to free the liquid of the hydrochloric acid formed in the process of decomposition, the acid vapors being carried off by the steam. Oxide of lead is next added and the liquid boiled to a low bulk—that is, the process of boiling is continued as long as the scales crystallize. The oxide of lead being dissolved by the glycerine displaces a quantity of salt, which separates from the glycerine by concentration. It must be remembered that the liquid before the addition of the oxide of lead is heated, and the free sulphuric acid, if any were present previous to heating, immediately decomposes the chloride of sodium that this liquid always contains and forms sulphate of soda and liberates the hydrochloric-acid vapors, which the steam removes. The liquid under treatment is now allowed to cool, and is then separated from the salts expelled and run into a suitable distilling apparatus, such as illustrated in the drawings, and again subjected to the steaming process, aided by a direct fire heat.

The still illustrated will now be described.

Referring to the drawings, A represents the retort; B, the masonry inclosing the same; C, the combustion-chamber, and C' the usual worm-condenser connected with and forming a continuation of the neck or beak $a$ of the retort.

The ring steam-coil D, of which a plan is shown in Fig. 2, is located on the inside bottom of the retort, as indicated by dotted lines in Fig. 1. This steam-coil is provided in the upper side with a number of perforations $a'$, through which the steam escapes into the contents of the retort. The steam-conducting pipe $a^2$ is a continuation of the coil located inside of the retort or still and connects with the source of supply. At this stage of the process the glycerine liquid in the retort or still is about ninety per cent. glycerine, eight per cent. chloride and sulphate of soda, and two per cent. oxide of lead. Superheated steam or steam under a high pressure being let into the retort and aided by a direct fire heat, the temperature of the glycerine is gradually raised as the water in it is expelled until it becomes anhydrous at a temperature of about 480° Fahrenheit. Charcoal or other carbonaceous matter is now added to act as a deoxidizing agent to convert the sulphate of soda into sulphide of sodium. This effect is due to the high temperature of the glycerine at the time of adding the deoxidizing agent. The completion of this part or step in the process is made known by the glycerine distilling over into the worm-extension and running out of one or more of the curved indicating-tubes $b$, inserted in the lower bends of the worm-coil. The body of these tubes is immersed in the water-receptacle $d$ for the purpose of cooling and condensing what little glycerine may escape through these tubes before the furnace-fire is deadened. The charge is next drawn from the still and run into a suitable receptacle and an oxide or hydrate of lime added to the glycerine liquid either with or without carbonate of lime to decompose the sulphide of soda into a carbonate of soda. The same results may be obtained by adding the oxide or hydrate of lime, or both together, with the carbonate of lime and the charcoal or other carbonaceous matter, all at the same time to the liquid while yet in the retort. The charcoal converts the sulphate of soda into a sulphide of soda, this being converted in the order of progression by the oxide, hydrate, or carbonate of lime into a carbonate of soda and then oxide or caustic soda. The object of running the glycerine liquid out of the retort or still before carrying out the last step described is to have the use of the retort to receive another charge, and thus continue the work without any loss of time. The liquid is next strained or allowed to settle in order to separate the undecomposed salt thrown out by the concentrated anhydrous glycerine. Fats, fatty acids, oils, or rosin are now added to the glycerine to take up the lye or caustic soda formed by the previous steps and convert the same into soap, which rises to the surface and may then be conveniently removed.

The use of steam is more for the purpose of agitating the liquid and carrying off the acid vapors than as a heating agent, the boiling part of the process being accomplished by means of a direct fire heat. If the steam-coil in the still were not perforated, the desired result would not be attained; but by injecting into and passing live steam through the mixture a different and better result is obtained than has been possible heretofore in the manufacture of glycerine.

The spent lyes vary so much as to the ingredients they contain—such as free lye, chloride of sodium, albuminous matter, soap matter, &c.—and the proportions of these different ingredients vary so much in the different lyes that no set rule can be followed in treating them. Therefore the materials used in treating the lyes must be varied in their proportions as the composition of the spent lyes may require.

Having thus described my invention, what I claim as new, and desire to secure by Letters Patent, is—

1. An improved step in the art of extracting glycerine from spent lyes, which consists in first treating the soap-liquid with sulphuric acid and then passing live steam directly through the mixture to take up and carry off the acid vapors, substantially as set forth.

2. An improved step in the art of extracting glycerine from spent lyes, which consists in first treating the soap-liquid with sulphuric acid, next passing live steam directly through the mixture, next adding oxide of lead, and then charcoal or other carbonaceous matter, substantially as set forth.

3. An improvement in the art of extracting glycerine, which consists in first treating the soap-liquid with sulphuric acid, next passing superheated steam or steam under high pressure directly through the liquid, next adding oxide of lead, then cooling and separating the composition from the salts expelled, then again passing steam through the liquid with the addition of a direct fire heat, next adding charcoal or other carbonaceous matter, then adding oxide of lime, and, finally, completing the process by separating the lye from the glycerine, substantially as set forth.

CHARLES LEWIS PORTER.

Witnesses:
L. M. FREEMAN,
L. B. COUPLAND.